Figure 1:
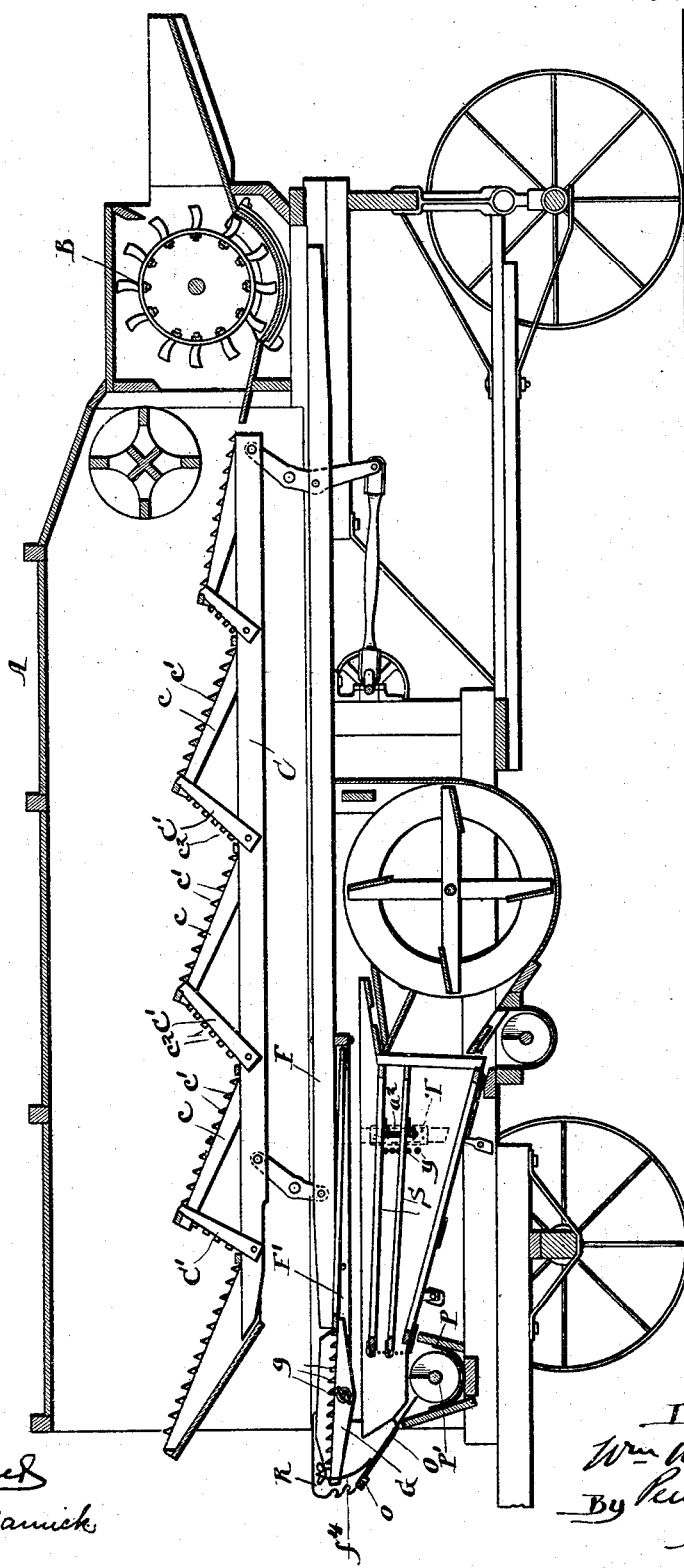

No. 640,997. Patented Jan. 9, 1900.
W. W. DINGEE.
THRESHING MACHINE.
(Application filed Aug. 8, 1898.)
(No Model.) 5 Sheets—Sheet 1.

Witnesses:
Fred Gerlach
Alberta Adamick

Inventor
Wm. W. Dingee
By Peirce & Fisher
Attorneys.

No. 640,997. Patented Jan. 9, 1900.
W. W. DINGEE.
THRESHING MACHINE.
(Application filed Aug. 8, 1898.)
(No Model.) 5 Sheets—Sheet 2.
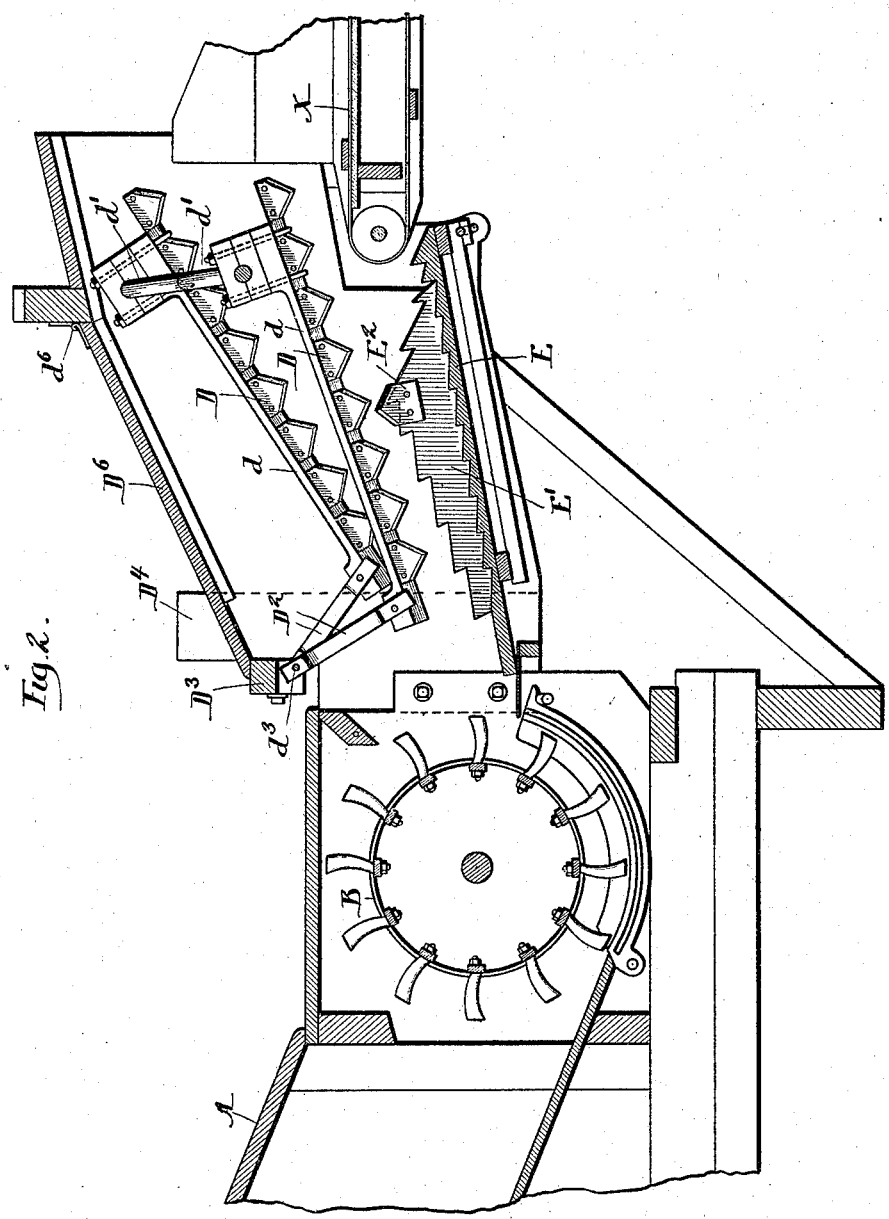

No. 640,997. Patented Jan. 9, 1900.
W. W. DINGEE.
THRESHING MACHINE.
(Application filed Aug. 8, 1898.)
(No Model.) 5 Sheets—Sheet 3.
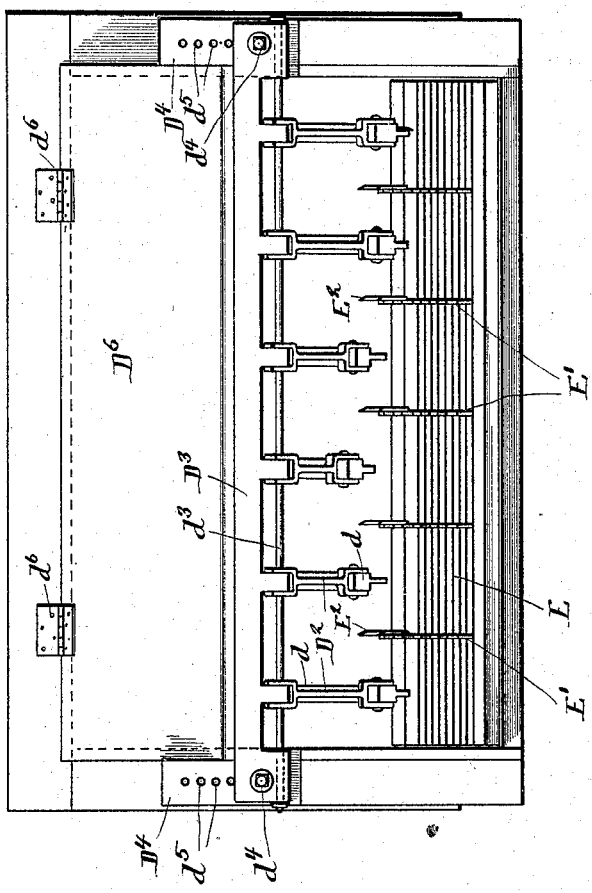
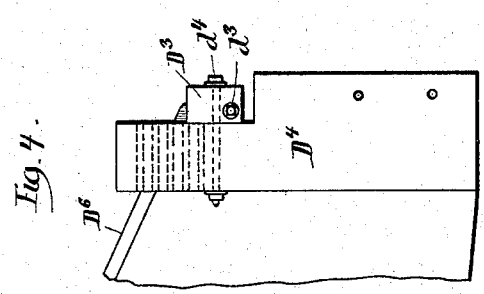
Witnesses:
Inventor:
Wm. W. Dingee
By Pierce & Fisher
Attorneys.

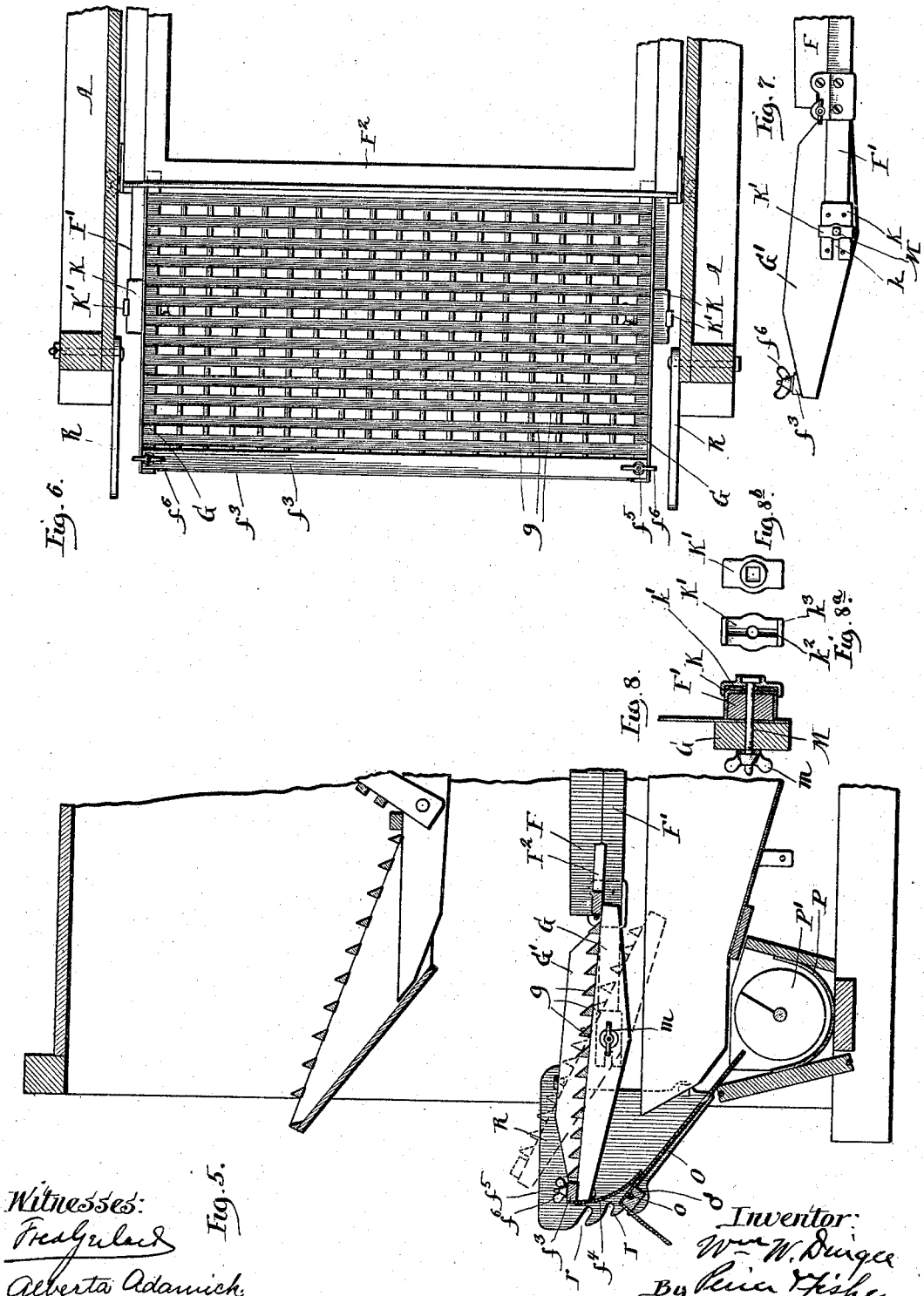

No. 640,997. Patented Jan. 9, 1900.
W. W. DINGEE.
THRESHING MACHINE.
(Application filed Aug. 8, 1898.)
(No Model.) 5 Sheets—Sheet 5.
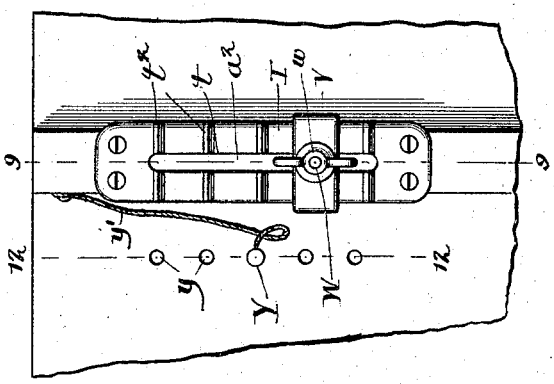
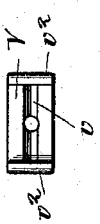
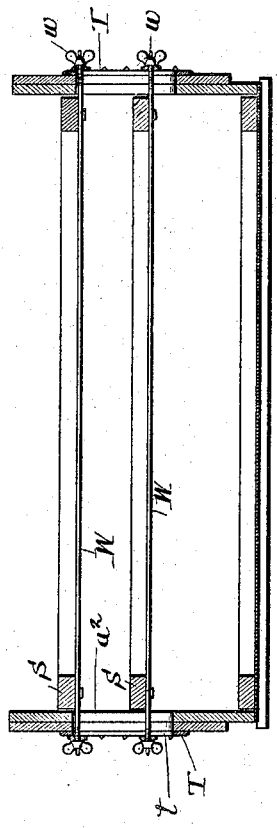
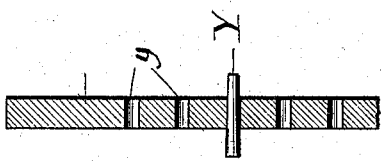
Witnesses:
Inventor:
Wm. W. Dingee
By Peirce & Fisher
Attorneys.

UNITED STATES PATENT OFFICE.

WILLIAM W. DINGEE, OF RACINE, WISCONSIN, ASSIGNOR TO THE J. I. CASE THRESHING MACHINE COMPANY, OF SAME PLACE.

THRESHING-MACHINE.

SPECIFICATION forming part of Letters Patent No. 640,997, dated January 9, 1900.

Application filed August 8, 1898. Serial No. 688,104. (No model.)

*To all whom it may concern:*

Be it known that I, WILLIAM W. DINGEE, a resident of Racine, Racine county, Wisconsin, have invented certain new and useful Improvements in Threshing-Machines, of which the following is hereby declared to be a full, clear, and exact description.

The present invention has for its object to provide various improvements in threshing-machines, which improvements are hereinafter fully described, illustrated in the accompanying drawings, and particularly defined in the claims at the end of this specification.

Figure 1 is a view in central vertical longitudinal section through a threshing-machine of familiar type having my invention applied thereto. Fig. 2 is an enlarged detail view, in central vertical section, through the threshing-cylinder and the hopper in front thereof. Fig. 3 is a view of the discharge end of the hopper shown in Fig. 2, the threshing-cylinder being removed. Fig. 4 is a side view of the discharge end of the hopper. Fig. 5 is a detail view, in vertical longitudinal section, through the discharge end of the machine. Fig. 6 is a plan view of the conveyer extension shown in Fig. 5, the sides of the machine being shown in section. Fig. 7 is a detail side view of the conveyer-rails. Fig. 8 is a detail view showing the manner of connecting the conveyer extension to its supporting-rail. Figs. $8^a$ and $8^b$ are detail views of shoes at the sides of the conveyer extension. Fig. 9 is a view in vertical cross-section through the sieves and parts at each side thereof, the section being taken on line 9 9 of Fig. 10. Fig. 10 is an enlarged detail side view of that part of the machine at the point where the sieves are adjustably sustained. Fig. 11 is a detail inner face view of the clamp-shoe, whereby the sieve-sustaining rods are adjustably supported. Fig. 12 is a detail view in vertical section on line 12 12 of Fig. 10.

A designates the body of the machine, at the front end of which is mounted the threshing-cylinder B of familiar construction. Within the body A is sustained the straw-rack C, this rack being mounted upon usual rocker-arms, whereby motion is communicated to the rack in manner well understood in the art. The straw-rack C is provided with the usual inclined bars $c$, that support the cross-slats $c'$. Prior to my present invention it has been the practice to provide inclined bars $c$ and slats $c'$ and to extend between the bars $c$ the slats $c'$ to points beneath the inclined bars $c$. An objection incident to such prior construction is that there was a tendency of the straw to accumulate upon the slats beneath the inclined bars $c$, thus preventing the grain from falling through the rack onto the conveyer beneath it. In order to overcome this objection, I have provided the forwardly-inclined risers $C'$, between which, from side to side of the rack, extend the slats $c^2$, these risers $C'$ and the slats $c^2$ serving as guards to prevent the accumulation of straw beneath the inclined bars $c$ and slats $c'$ of the straw-rack.

In order to cut the twine or bands whereby the bundles of grain are bound, it has heretofore been the practice to provide the hopper with a series of band-cutting knives D, (see Fig. 2,) mounted upon bars $d$, to which a compound movement was imparted through the medium of suitable cranks $d'$. In practice it has been found that with such construction it not infrequently happens that bands will escape being cut, thereby causing danger of the clogging or inefficient action of the threshing-cylinder. It has also been the common practice to provide the movable hopper-bottom E with vertical saw-tooth blades $E'$ for advancing the grain toward the threshing-cylinder. To secure the more effective breaking up of the bundles and insure the cutting of the bands, I have provided the saw-blades $E'$ with supplemental band-cutters $E^2$, these cutters having reversely-inclined cutting edges, as clearly seen in Fig. 2 of the drawings. The result of this construction is that as the bundles are fed by the endless carrier X into the hopper the supplemental cutters $E^2$ insure the cutting of all bands and also aid in breaking up the bundles, so as to more effectively present them to the threshing-cylinder B.

Inasmuch as the bundles of grain often vary in size, it is highly desirable, to insure the effective feeding of the grain through the hopper and to the threshing-cylinder, that provision be made for adjusting the swinging rods whereby the rear ends of the rake-bars and the band-cutters are carried. To accomplish this, the upper ends of the swinging rods D² are pivotally connected to a vertically-adjustable cross-bar D³. (See Figs. 2 and 3.) Preferably the upper ends of the rods D² are bifurcated and are mounted upon a rod $d^3$, that passes through the depending end portions of the cross-bar D³. To secure the vertical adjustment of the cross-bar D³, this bar is shown as provided at each end with a bolt $d^4$ passing therethrough, each of the bolts $d^4$ also passing through holes $d^5$, formed in one of the vertical posts D⁴ at the corresponding side of the machine. It will thus be seen that by shifting the bolts $d^4$ to higher or lower holes $d^5$ of the posts D⁴ the rear ends of the bars $d$ can be raised or lowered to suit the sizes of bundles that may be delivered to the machine. The hopper-cover D⁶ is hinged, as at $d^6$, and the lower free end of the cover rests upon the top of the cross-bar D⁴, so that as the cross-bar is raised or lowered the cover D⁶ is carried with it.

In order to more effectively keep the chaff out of the tailings and to prevent grain being carried away with the chaff, I have provided the conveyer extension, next to be described. By reference to Figs. 1 and 5 to 8 of the drawings it will be seen that the side rails F of the conveyer that extends beneath the straw-rack C are formed with the outwardly-extended rail-sections F', these rail-sections being shown as bolted to the under side of the conveyer-rails F. Between the rail extensions F' and at the rear end of the usual conveyer-sieve F² is mounted the conveyer extension that is shown as consisting of end bars G, between which extend the cross-slats $g$, these slats having preferably inclined upper surfaces, as shown. I prefer to provide metal plates G' at the sides of the bars G and to connect the conveyer extension to the rail extensions F', as more particularly shown in Figs. 5, 7, and 8 of the drawings—that is to say, each rail extension F' has attached to its free end the metal shoe K, formed with a slot $k$, that coincides with a similar slot cut in the end of the rail F'. The slots $k$ serve to receive the pivot-bolts M, whereon the conveyer extension is adjustably sustained. The outer face of each of the shoes K is shown as formed with a transverse rib $k'$, adapted to set within the corresponding groove $k^2$, that is formed in the inner face of the guard-plate K', through which the bolt M passes and against which the head of the bolt bears. Each of the shoes K' has its ends formed with inwardly-projecting flanges or ribs $k^3$, that slightly overlap the outer sides of the shoes K and prevent the guard-plates from turning upon the shoe. The bolts M pass through the side bars G of the conveyer extension, and upon the inner threaded ends of each of these bolts is mounted a thumb-nut $m$, whereby when the conveyer is turned at the desired angle it may be there securely retained.

From the foregoing description it will be seen that as the chaff passes over the conveyer extension the tailings will fall therefrom between the slats $g$. If, however, it is found that the grain is being carried off with the chaff, the operator will turn the conveyer extension from the position shown by full lines toward the position shown by dotted lines in Fig. 5 of the drawings. The effect of this inclination of the conveyer extension will be to retard the outflow of the grain and chaff, thereby securing their effective separation and preventing the grain passing off with the chaff and as well also keeping the chaff out of the tailings. It will be understood, of course, that the adjustment of the conveyer extension will be in keeping with the character and condition of the grain being operated upon; but by loosening the thumb-nuts $m$ the conveyer extension may be turned to any desired position, after which by tightening the thumb-nuts it will be securely retained in place. By forming the rail extensions F' with open slots at their ends it will be seen that the conveyer extension can be readily removed when desired.

The rear end of the conveyer extension is shown as provided with a cross-bar $f^3$, that carries a depending canvas flap $f^4$, that serves to direct downward and onto the plate O any tailings passing through the rear portion of the conveyer extension, the plate O serving in turn to deliver such tailings into the tailings-trough P, whence it will be removed by the auger P'. The bar $f^3$ is shown as attached to the side bars G of the conveyer extension by bolts $f^5$ and thumb-nuts $f^6$. In order to permit the deflecting-plate O to be adjusted in keeping with the adjustments of the conveyer extension, I have provided at each side of the main frame the rearwardly-extending plates R, that are formed with notches $r$, adapted to receive the bolts or pins $o$, that project from the bars $o'$ at the top of the deflecting-plate O. Thus by reference to Fig. 5 it will be seen that when the conveyer extension is in the approximately horizontal position there shown the deflecting-plate O will be sustained from the lowest notches $r$ of the plates R, but when the conveyer extension is inclined—say to the position shown by dotted lines—the deflecting-plate O will be correspondingly raised and its bolts $o$ will rest in the uppermost notches $r$ of the plates R.

In order to enable the sieves S to be adjusted in keeping with the character of the grain being operated upon so as to insure a more effective separation of the grain, I have provided the means illustrated more particularly in Figs. 9 to 12 of the drawings. In each side wall A' of the main body of the machine, at points opposite the forward ends of the sieves S, are formed the long slots $a^2$, and opposite these slots are attached the plates T, having the slots $t$, that coincide with the corresponding slots $a^2$. Through the slots $a^2$ and $t$ extend the rods W, that extend beneath and serve to support the forward ends of the sieves S. The outer ends of each of the rods W pass through adjustable guard-plates V, and are screw-threaded to receive the thumb-nuts $w$, that serve to tightly hold the guard-plates V in position upon the plates T. By reference to Fig. 11 it will be seen that each of the guard-plates V has its inner face formed with a groove $v$, adapted to set upon the transverse ribs $t^2$ of the plate T, and at the ends of the guard-plate V are formed the flanges $v^2$, that bear against the sides of the plate T and prevent the turning of the guard-plates when the thumb-nuts are tightened. The guard-plates V are preferably of such width as to fit between adjoining ribs $t^2$ of the plate T, and hence the rods W, and consequently the sieves sustained thereby, can be adjusted to any points corresponding to the transverse rib $t^2$ or to the space between said ribs. In order to enable the operator to readily effect the adjustment of the sieves, I form the sides $A'$ of the machine adjacent the plates T with a series of holes $y$, corresponding in number and arrangement to the ribs $t^2$ and intermediate spaces of the plates T, as clearly shown in Fig. 10 of the drawings, and through the hole $y$ will be inserted the supporting-pin Y, the inner end of which will serve to temporarily sustain the adjacent side of the sieve while the rod W is being adjusted. To prevent the loss of pin Y, it is shown as attached to a cord $y'$, the outer end of which is secured to the side of the machine. The rear ends of the sieves are sustained upon pivot-rods in the usual manner.

From the foregoing description it will be seen that when it is desired to change the inclination of the sieves the operator will set the pin Y into the hole $y$ corresponding with the point at which it is desired to set the sieve. Having done this, he can loosen the thumb-nut $w$ of the rod W and permit the sieve to rest upon the inner ends of the pins Y. The operator will then set the guard-plates V at the desired point upon the plates T, and by tightening up the nut $w$ will securely fix the rods at the point at which it is desired to sustain the sieves. In practice the pins Y are found highly advantageous, since they relieve the rods from the weight of the sieves during the adjustment of the rods, and thus enable the operator to much more readily effect the adjustment of the sieves.

While I have described what I regard as the preferred embodiment of my invention, it will be readily understood that the details of construction above set out may be varied without departure from the scope of the invention and that parts of the invention may be used without its adoption as an entirety.

Having thus described my invention, what I claim as new, and desire to secure by Letters Patent, is—

1. In a threshing-machine the combination with the conveyer provided with open-ended bearings at its rear end, of a conveyer extension removably mounted at the rear end of said conveyer, pivot-bolts passing through said conveyer extension and through said open bearings and adjusting-nuts upon the outer ends of said pivot-bolts, said bolts and nuts serving to removably hold said conveyer extension in position and serving also to hold said conveyer extension at different angles with respect to said conveyer.

2. In a threshing-machine, the combination with the conveyer provided with extension-arms having open-ended bearings, of a conveyer extension removably mounted at the rear end of said conveyer and having pivots that enter said open-ended bearings of the extension-arms and means for removably holding said conveyer extension within said bearings and at different angles with respect to the conveyer, substantially as described.

3. In a threshing-machine, the combination with the side walls having slots $a^2$ therein, of the sieves S mounted between said side walls, slotted plates T arranged opposite the slots of the side walls and outside thereof and provided with transverse ribs or lugs $t^2$, rods extending beneath the sieves, shoes V notched to engage said ribs $t^2$ on the ends of said rods and nuts for adjustably holding said shoes in position upon the plates T.

4. In a threshing-machine, the combination with the side walls having slots $a^2$ therein and having a vertical row of holes $y$ adjacent said slots $a^2$, of the sieves S mounted between said side walls, slotted plates T arranged opposite the slots of the side walls, rods for supporting said sieves having their ends extending through the slots of the side walls and through said slotted plates, shoes and adjusting-nuts upon the ends of said rods for holding them in position and pins Y adapted to enter the holes in the side walls at the side of said slotted plates and temporarily support the sieves.

WILLIAM W. DINGEE.

Witnesses:
WARREN E. FISH,
OWEN P. GRAHAM.